United States Patent
Nishimura et al.

(10) Patent No.: US 8,432,925 B2
(45) Date of Patent: Apr. 30, 2013

(54) APPARATUS AND METHOD FOR CONTROLLING BUFFERING OF AN ARRIVAL PACKET

(75) Inventors: Kazuto Nishimura, Kawasaki (JP);
Hiroshi Tomonaga, Kawasaki (JP);
Akihiro Hata, Kawasaki (JP);
Masamichi Kasa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 12/404,502

(22) Filed: Mar. 16, 2009

(65) Prior Publication Data

US 2009/0245104 A1    Oct. 1, 2009

(30) Foreign Application Priority Data

Mar. 27, 2008  (JP) .................. 2008-083325

(51) Int. Cl.
*H04L 12/56* (2006.01)
(52) U.S. Cl.
USPC .......................... 370/412; 370/230
(58) Field of Classification Search .............. 370/232, 370/235, 230.1, 412, 230
See application file for complete search history.

(56) References Cited

U.S. PATENT DOCUMENTS

| 6,560,198 | B1 * | 5/2003 | Ott et al. ............. 370/235 |
| 7,768,919 | B1 * | 8/2010 | Conway ............. 370/232 |
| 2002/0071387 | A1 | 6/2002 | Horiguchi et al. |

FOREIGN PATENT DOCUMENTS

| JP | 2000-307602 | 11/2000 |
| JP | 2002-185501 | 6/2002 |
| JP | 2003-23456 | 1/2003 |

OTHER PUBLICATIONS

Japanese Office Action dated Mar. 6, 2012 issued in corresponding Japanese Patent Application No. 2008-083325 (4 pages) (3 pages English translation, p. 1, line 3-p. 1, line5, p. 1, line 14-p. 3, line 1).

\* cited by examiner

*Primary Examiner* — Chandrahas Patel
(74) *Attorney, Agent, or Firm* — Staas & Halsey LLP

(57) ABSTRACT

An apparatus for controlling buffering of an arrival packet. The apparatus includes a packet buffer for temporarily storing each of one or more packets to be transmitted in association with an arrival time thereof, and a packet discard section for determining an arrival packet to be discarded or to be stored in the packet buffer, based on a discard condition defined by using a packet residence time that is calculated on the basis of one or more residence times of one or more packets staying in the packet buffer, wherein the arrival packet is defined as a packet that has newly arrived at the apparatus.

19 Claims, 13 Drawing Sheets

APPARATUS AND METHOD FOR CONTROLLING BUFFERING OF AN ARRIVAL PACKET

CROSS-REFERENCE TO RELATED APPLICATIONS

This application is based upon and claims the benefit of priority of the prior Japanese Patent Application No. 2008-083325, filed on Mar. 27, 2008, the entire contents of which are incorporated herein by reference.

FIELD

The present invention relates to technique for controlling buffering of a packet that has arrived at an apparatus and is to be transmitted from the apparatus.

BACKGROUND

Many packet devices have a buffer (hereinafter, referred to as "a packet buffer") for temporarily storing a packet before transmitting it. Typically, the packet buffer is embodied by a memory. The upper limit of the amount of packets accumulatable in the packet buffer is determined by capacity of a memory mounted in the packet device. Some kinds of packet devices are used by logically dividing a physical memory into a plurality of queues. Among such packet devices, some packet device sets the upper limit of the amount of packets accumulatable for each logical queue.

One of the basic methods for arrival packet discard determination by the packet device (or for determining a packet that has newly arrived at the packet device to be discarded or not) is a method wherein an upper limit (upper limit threshold value) is set to a queue length of the packet buffer (that is, a size of area occupied by packets within the packet buffer), and when the upper limit threshold value is exceeded, subsequently arrival packets are discarded. This type of method for arrival packet discard determination is referred to as a Tail Drop method.

FIG. 10 is a schematic diagram illustrating an example of a method for arrival packet discard determination by using discard priority, where an arrival packet is denoted by "P" and a queue constituting a packet buffer is depicted. This method is an application of the Tail Drop method. In this method, discard priority is set for each of packets. For example, discard priorities can be classified by assigning each thereof a color. The packet having a high discard priority is represented by "yellow" (denoted by "Y" in FIG. 10), while the packet having a low discard priority is represented by "green" (denoted by "G" in FIG. 10). The upper limit threshold value of the yellow packet is set to be lower than that of an ordinary packet buffer (upper limit threshold value in the case of the Tail Drop). When the queue length of the packet buffer P7 excesses the upper limit threshold value of the yellow packet, a newly arrived yellow packet is discarded by a discard determination section P11 before it is buffered in the packet buffer P7. On the other hand, the green packet is buffered into the packet buffer P7.

In this manner, by setting the upper limit threshold value of the yellow packet, which is prone to be discarded, at a value lower than that of the ordinary packet buffer, it is possible to make the green packet, which is expected to be transmitted on a priority basis, less prone to be discarded.

FIG. 11 is a diagram illustrating an example of a method for arrival packet discard determination which is referred to as RED (random early determination). According to the RED method, the packet is discarded on a probabilistic basis. In the RED method, two threshold values are provided for a packet buffer P7: a maximum threshold value (denoted by "Max_th") and a minimum threshold value (denoted by "Min_th"). In FIG. 11, a probability of discarding an arrival packet is represented by a vertical axis, and a queue length of the packet buffer P7 is represented by a horizontal axis along which a value of the queue length is increasing leftward. When the queue length of the packet buffer P7 is smaller than the minimum threshold value (Min_th), an arrival packet is stored in the packet buffer P7 without being discarded. When the queue length of the packet buffer P7 is a value intermediate between the minimum threshold value and the maximum threshold value, a RED determination section P12 discards the arrival packet (P) on a probabilistic basis. The probability of discarding the arrival packet is represented, as depicted in FIG. 11, by a linear curve L1 having, as an upper limit, a value equal to the discard probability at the maximum threshold value (i.e., a maximum discard possibility "Max_p"). When the queue length of the packet buffer P7 exceeds the maximum threshold value, all packets (P) newly arrived at the packet buffer P7 are discarded (called "Tail Drop").

SUMMARY

According to an aspect of the invention, an apparatus includes a packet buffer for temporarily storing each of one or more packets to be transmitted in association with an arrival time thereof, and a packet discard section for determining an arrival packet, defined as a packet that has newly arrived at the apparatus, to be discarded or to be stored in the packet buffer, based on a discard condition defined by using a packet residence time that is calculated on the basis of one or more residence times of one or more packets staying in the packet buffer.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENTS

According to each of the above-described known methods for arrival packet discard determination, the queue length of a packet buffer is considered as an index (criterion or condition) for determining discard of an arrival packet.

However, an arrival packet can be determined to be discarded by using an index different from the queue length of the packet buffer.

Hereinafter, embodiments of methods for arrival packet discard determination are described with reference to the appended drawings. Embodiments described below are illustrative and the methods are not limited to the embodiments.

Figure 1:
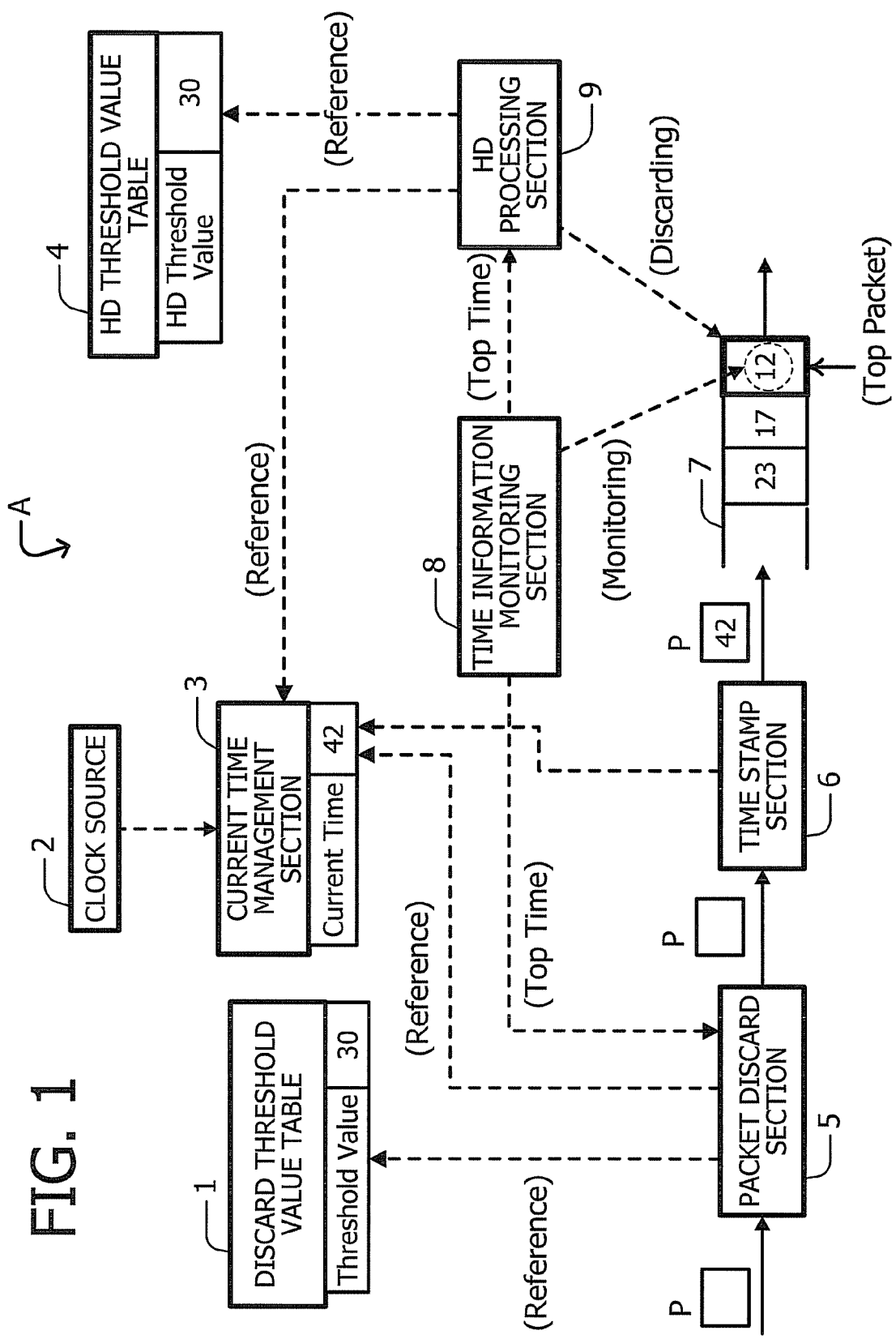
FIG. 1 is a diagram illustrating an example of a method for arrival packet discard determination, according to a first embodiment.

FIG. 1 is a diagram illustrating an example of a method for arrival packet discard determination based on a residence time of a packet. A packet buffer management device A depicted in FIG. 1, which implements the method for arrival packet discard determination, can be, for example, mounted on a packet device (e.g., a router, an L3 switch, an L2 switch, and an HUB).

The packet buffer management device A includes, for example, a discard threshold value table 1, a clock source 2, a current time management section 3, an HD threshold value table 4, a packet discard section 5, a time stamp section 6, a packet buffer 7, a time information monitoring section 8, and an HD processing section 9. The packet buffer management device A can be, for example, arranged on the output interface side of the packet device. In the case, for example, the packet discard section 5 receives a packet that was input to an input interface of the packet device and then has been switched by a switch fabric thereof. For example, the packet stored in the packet buffer is outputted to an output buffer of an output port of the packet device.

The clock source 2 sends clock signals to the current time management section 3. The current time management section 3 converts the clock signals received from the clock source 2 into time, and holds it as the current time. For example, either the number of clock signals received after the device has started may be treated as time, or a lapse time from the start which is calculated from an accumulated number of clock signals may be treated as time. In the case where the clock source 2 is a clock incorporated in hardware of a computer, the time of the clock may be treated as time, as it is.

The time stamp section 6 acquires the current time from the current time management section 3, and adds the current time to an arrival packet. The current time is added to the packet as an arrival time of the packet. The arrival time added by the time stamp section 6 is valid only inside the device, and it is removed when the packet is transmitted from the packet buffer 7.

The packet buffer 7 is a storage device for temporarily storing one or more packets in order to accommodate the difference between timing of the packet being outputted and timing of the packet being received. Fractions of the packet buffer 7 obtained by logically dividing the packet buffer 7 are referred to as queues. The packet buffer 7 may be one of the logical queues. Packets stored in the packet buffer 7 are outputted in the inputting order by a queuing technique such as FIFO (first in first out). However, some packets in the packet buffer 7 may be discarded without being outputted.

The time information monitoring section 8 monitors an arrival time added to "a top packet" (that is, a packet located at the top position of a queue) in the packet buffer 7, the arrival time added to the top packet being hereinafter referred to as a "top time". In the case, a top time becomes the minimum time among arrival times of one or more packets staying in the packet buffer 7. The time information monitoring section 8 delivers the top time to the packet discard section 5 and the HD processing section 9.

The discard threshold value table 1 holds a time threshold value functioning as criterion for determining whether arrival packets are to be discarded or to be stored in the packet buffer 7.

The packet discard section 5 acquires the current time from the current time management section 3, and acquires a top time from the time information monitoring section 8. The packet discard section 5 determines whether the arrival packet is to be discarded or to be stored in the packet buffer 7, on the basis of the current time, the top time, and the time threshold value held by the discard threshold value table 1.

In FIG. 1, the time stamp section 6 adds an arrival time to the packet that has been determined by the packet discard section 5 to be stored in the packet buffer 7. The time stamp section 6 can also be configured to add an arrival time to the arrival packet before being inputted to the packet discard section 5, and the packet discard section 5 can be configured to determine whether to be discarded or not, with respect to the arrival packet having the arrival time added.

The HD (head drop) threshold value table 4 holds an HD threshold value indicating a upper limit of permissible time during which packets can stay in the packet buffer 7. The HD processing section 9 acquires the current time from the current time management section 3, and acquires a top time from the time information monitoring section 8. The HD processing section 9 determines whether the packet stored in the packet buffer 7 is to be discarded, on the basis of the current time, the top time, and the HD threshold value.

The current time management section 3, the packet discard section 5, the time stamp section 6, the time information monitoring section 8, and the HD processing section 9 may be implemented by either an integrated circuit such as an ASIC (application specific integrated circuit), or by a CPU (central processing device) mounted on the device.

[Method for Arrival packet Discard Determination]

Upon arrival of a packet, the packet discard section 5 acquires the current time from the current time management section 3. Along therewith, the packet discard section 5 acquires a top time of a top packet from the time information monitoring section 8. The packet discard section 5 determines the difference between the current time and the top time. The difference between the current time and the top time indicates a residence time during which the top packet stays in the packet buffer 7. In the case, the residence time of the top packet becomes the maximum residence time among one or more packets staying in the packet buffer 7. The packet discard section 5 acquires a time threshold value from the discard threshold value table 1. The packet discard section 5 determines whether the arrival packet is to be discarded or to be stored in the packet buffer 7, on the basis of the current time, the top time, and the time threshold value. At this time, the following conditional expression 1 is employed.

(current time−top time)≧time threshold value         [Conditional expression 1]

When this conditional expression 1 is satisfied, the arrival packet is discarded. When not, the arrival packet is stored in the packet buffer 7.

For example, in FIG. 1, the top time of the top packet is "12", and the current time is "42". Therefore, the difference between the current time and the top time (i.e., residence time of the top packet) is 42−12=30. Since this value is equal to the time threshold value 30 shown in the discard threshold value table 1, the packet discard section 5 discards the arrival packet.

A method wherein an arrival packet to be discarded is determined by using the current time, the top time, and the time threshold value, as mentioned above, is referred to as a "time-based arrival packet discard determination method".

According to the first embodiment, the packet buffer management device temporarily stores at least one packet having an arrival time added in a packet buffer, and when a new packet has arrived, when the residence time of said at least one packet stored in the packet buffer satisfies the discard condition of the new packet, it discards the new packet, and when the residence time does not satisfy the discard condition, it stores the new packet in the packet buffer. This allows an arrival packet discard determination to be made using, for example, a residence time of a packet staying in the packet buffer, the residence time of a packet being an index different from the queue length.

[Queue Management Method]

Packets stored in the packet buffer 7 are managed by, for example, the following queue management method. The HD (head drop) processing section 9 acquires a top time from the time information monitoring section 8. The HD processing section 9 determines whether the current time, the top time, and the HD threshold value time stored in the HD threshold value table 4 satisfy the following conditional expression 2. When the following conditional expression 2 is satisfied, the top packet is discarded.

(current time−top time)≧HD threshold value         [Conditional expression 2]

The queue management method mentioned above is referred to as TBHD (time-based head drop).

According to the above mentioned queue management method, packets staying for a long time in the packet buffer can be discarded. By discarding packets staying for a long time in the packet buffer, it is possible to reduce possibility that, because of some packets occupying the packet buffer, an arrival packet with a high priority may be discarded before being stored in the packet buffer.

As mentioned above, according to the first embodiment, a technique for making an arrival packet discard determination using an index different from the queue length can be provided.

In the case wherein packets stored in the packet buffer 7 are managed by a method similar to the above-described TBHD, the time-based arrival packet discard determination method allows consistent queue management since the time-based arrival packet discard determination method determines an arrival packet to be discarded by using, as an index, time as in the case of the TBHD.

Figure 2:
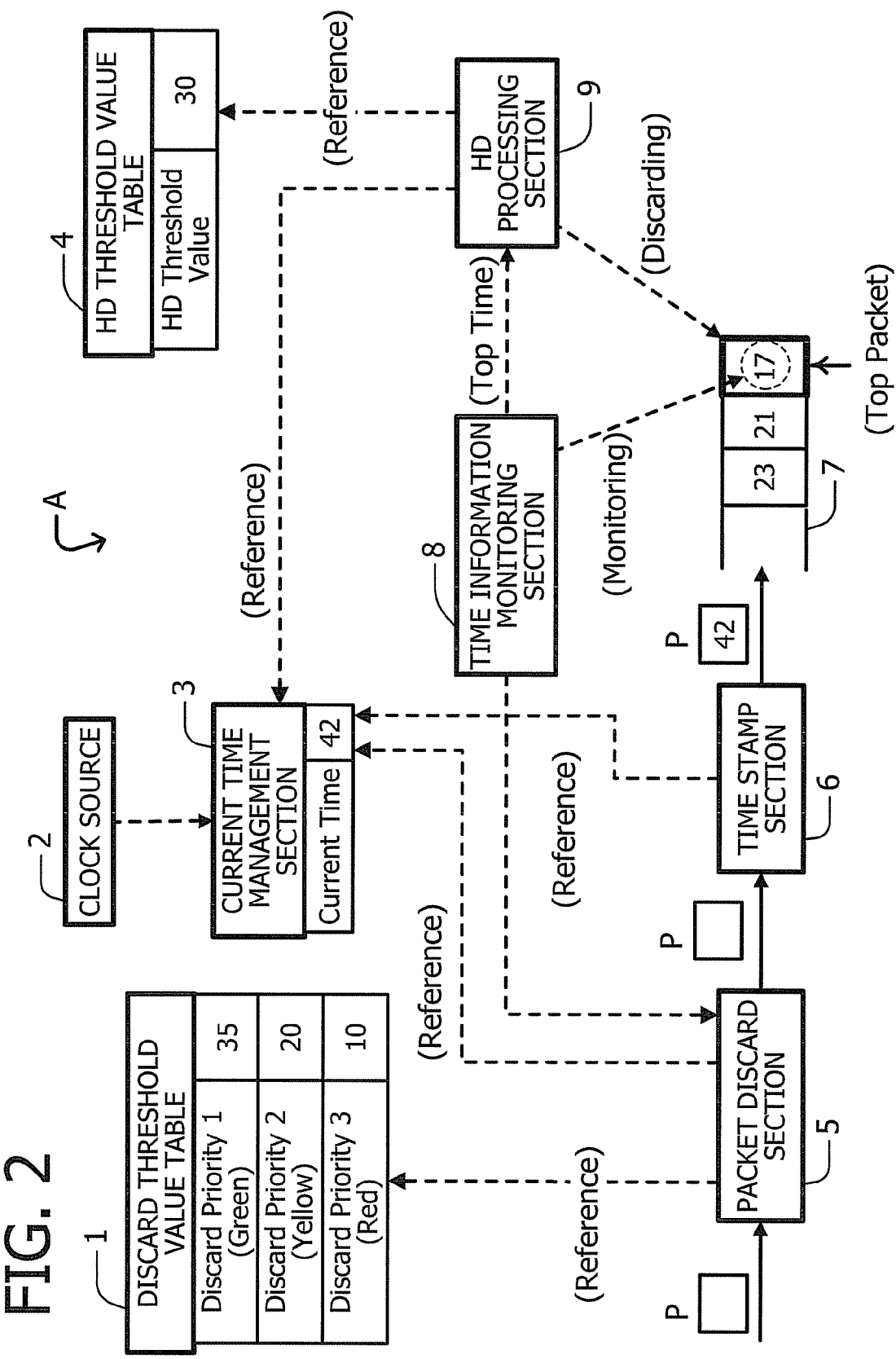
FIG. 2 is a diagram illustrating an example of a method for arrival packet discard determination, according to a second embodiment.

FIG. 2 is a diagram illustrating an example of a method for arrival packet discard determination according to a second embodiment. Since the second embodiment has a configuration common to the first embodiment, differences therebetween are mainly described below, and commonalities therebetween are omitted from description.

The discard threshold value table 1 holds discard threshold values for each priority level of packet. The priority level here refers to a priority level of sending a packet. That a packet has a higher priority level indicates that the packet should be sent in preference to other packets with lower priority levels. On the other hand, the discard priority level refers to a priority level of discarding a packet. For example, that a packet has a higher discard priority level indicates that the packet should be discarded in preference to other packets with lower discard priority levels. Since a packet having a higher priority level should be preferentially sent, its discard priority level is lower. Conversely, a packet having a lower priority level is higher in discard priority. Priority levels and discard priority levels to be set for packets may be set by the identical device, or alternately, priority levels and discard priority levels set by other devices may be used. For example, when a packet is an Ethernet frame, its priority level can be set by using DE bits of the frame. That is, information indicating priority is contained in the packet.

For example, the priority levels of packets can be classified by colors. For example, the priority levels can be determined in the order of green>yellow>red. By which color a packet level is to be classified may be determined by a manager. For example, a packet classified as a green packet is a packet, such as a voice packet, of which a delay significantly affects service quality. Time threshold values can be determined for each priority level classified by color. At this time, by determining the time threshold values so that they also become in the order of green>yellow>red, the red packet with a lower priority level earlier starts to be discarded than the green packet with a higher priority level.

Upon arrival of a packet, the packet discard section 5 acquires the current time from the current time management section 3. Along therewith, the packet discard section 5 acquires a top time of a top packet from the time information monitoring section 8. The packet discard section 5 reads a discard priority level of the arrival packet, and acquires a threshold value corresponding to the discard priority level thereof from the discard threshold value table 1. The packet discard section 5 determines whether the arrival packet is to be discarded or to be stored in the packet buffer 7, on the basis of the current time, the top time, and the threshold value corresponding to the discard priority level. At this time, the following conditional expression 3 is used.

(current time−top time)≧threshold value corresponding to the pertinent discard priority level         [Conditional expression 3]

When this conditional expression 3 is satisfied, the arrival packet is discarded. When not, the arrival packet is stored in the packet buffer 7.

For example, in FIG. 2, the top time of the top packet is "17", and the current time is "42". Therefore, the difference between the current time and the top time (i.e., residence time of top packet) is (42−17=25).

When the arrival packet is a green packet, since threshold of the green packet (discard priority 1) is "35" as depicted in the discard threshold value table 1, the following relationship is obtained: residence time≦threshold value of discard priority 1. Therefore, when the arrival packet is a green packet, the arrival packet is not discarded, and after having been subjected to an addition of an arrival time by the time stamp section 6, it is stored in the packet buffer 7.

When the arrival packet is a yellow packet, since the threshold of the yellow packet (discard priority 2) is "20", the following relationship is obtained: residence time≧threshold value of discard priority 2. Therefore, when the arrival packet is a yellow packet, the arrival packet is discarded.

When the arrival packet is a red packet, since the threshold of the red packet (discard priority 3) is "10", the following relationship is obtained: residence time≧threshold value of discard priority 3. Therefore, when the arrival packet is a red packet, the arrival packet is discarded.

In the above-described processing, the arrival packets contain information indicating priority levels of packets (sorts of colors in the case), and by using discard threshold values of discard priorities according to each of the above-described priority levels, the packet discard section 5 implements the above-described judgment in determination of discard.

Advantage of Second Embodiment

By setting threshold values for each discard priority level (or each priority level) of packet, it is possible to discard packets in the descending order of the discard priority levels, i.e., in the ascending order of the propriety levels. For example, the combination of this method and the TBHD as a queue management method would give effects described below, as compared with the case where the method by the conventional art (hereinafter referred to as a "queue length-based arrival packet discard determination method") is employed.

Figure 3A:
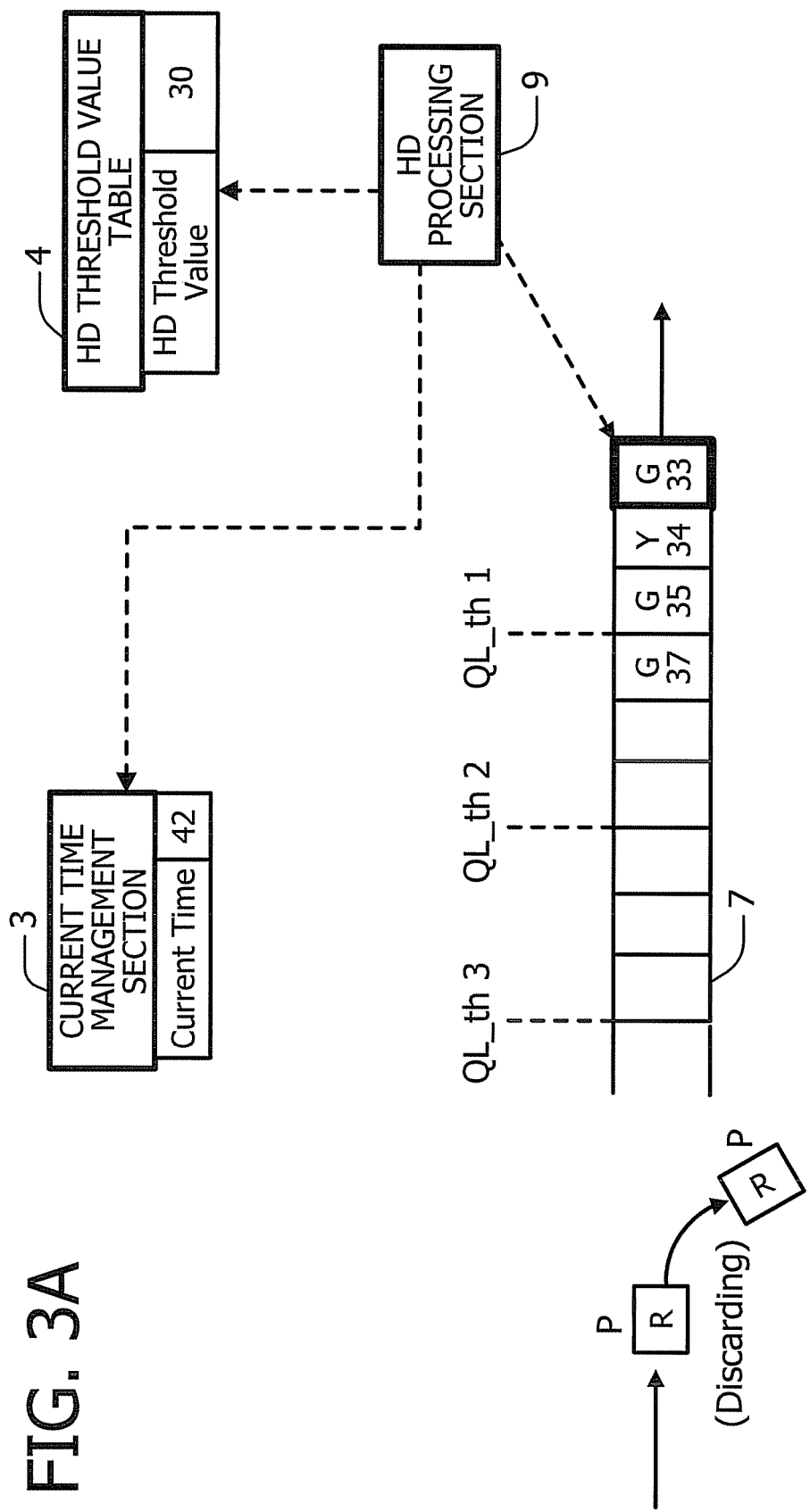
FIG. 3A is a schematic diagram for explaining an example of an event that can occur when a queue length-based arrival packet discard determination method and a Time-Based Head Drop (TBHD) are combined.

FIG. 3A is a schematic diagram for explaining an example of an event that can occur when a queue length-based arrival packet discard determination method and a TBHD are combined. In FIG. 3A, only essential function sections are illustrated in a simplified manner.

In FIG. 3A, the current time is "42" as depicted in the current time management section 3, and HD threshold value is "30" as depicted in the HD threshold value table 4. Threshold values are set for the queue length of the packet buffer 7. A queue length threshold value 1 (QL_th 1) indicates the upper limit of a red packet, a queue length threshold value 2 (QL_th 2) indicates the upper limit of a yellow packet, and a queue length threshold value 3 (QL_th 2) indicates the upper limit of a green packet. The top packet is the green packet, and the top time is "33". Therefore, there is a sufficient time leeway until the green packet as the top packet is discarded by the TBHD ((current time "42"–top time "33")≧HD threshold value "30"). Here, the queue length of the packet buffer 7 exceeds the upper limit (queue length threshold value 1) of the red packet.

As depicted in FIG. 3A, since the queue length of the packet buffer 7 exceeds the upper limit of the red packet, when the red packet arrives, the arrived red packet is discarded. That is, although there is a sufficient time leeway until the top packet is discarded by the TBHD, the arrived red packet is undesirably discarded because the queue length of the packet buffer 7 exceeds the upper limit of the red packet. When such phenomena continue, there occurs a possibility that excess discard of low priority packets (red packets) may arise.

Figure 4:
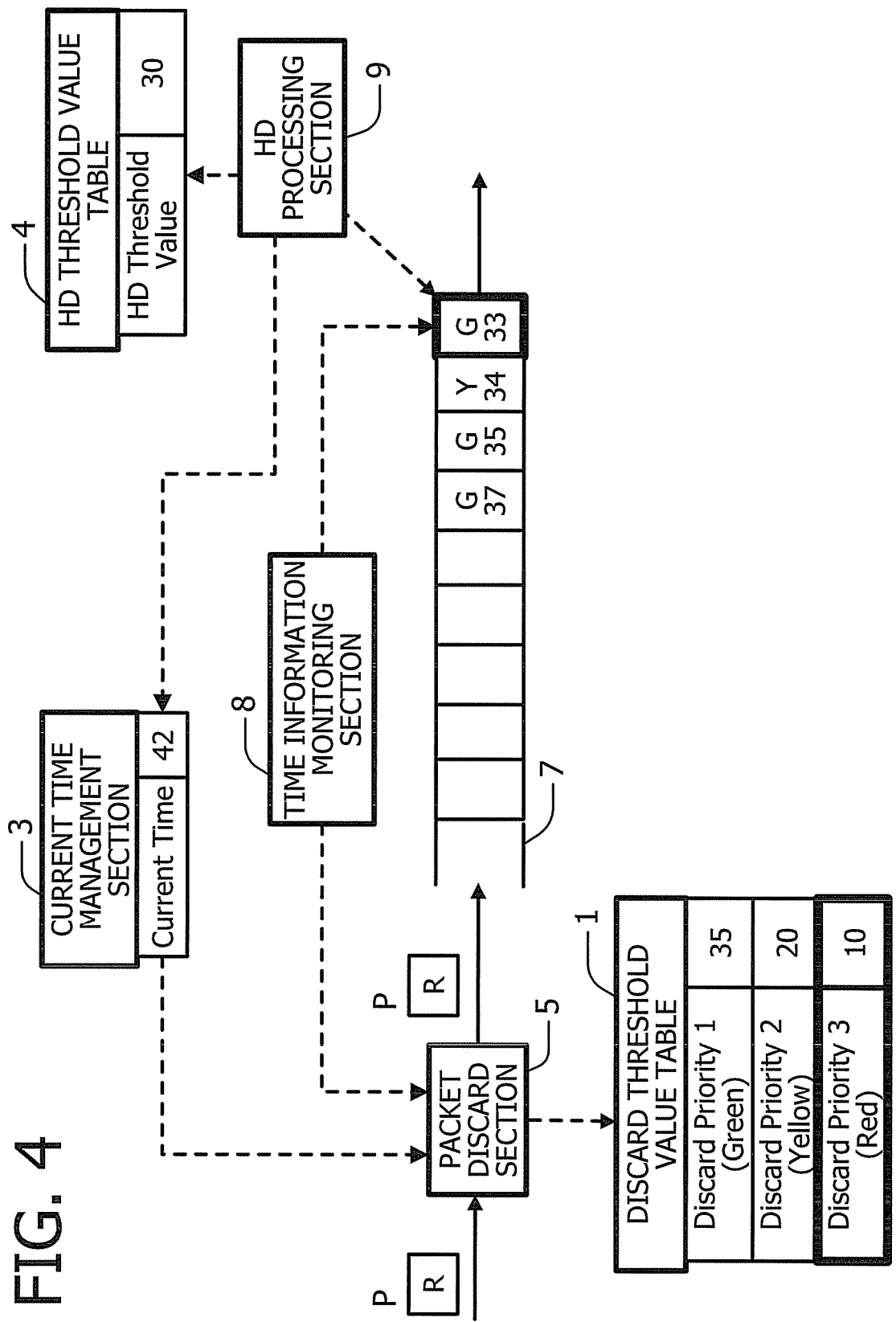
FIG. 4 is a schematic diagram illustrating an example of a case where an arrival packet discard determination method in which discard determination is made for each priority of packet in a time-based manner, and a TBHD are combined.

FIG. 4 is a schematic diagram illustrating an example of a case where an arrival packet discard determination method in which discard determination is made for each priority level of packet in a time-based manner, and the TBHD are combined.

In FIG. 4, the current time, the top time, and the HD threshold value are the same as those depicted in FIG. 3A.

When a red packet (denoted by "R") arrives, current time–top time=42–33=9. Because the discard threshold value of the red packet is "10" as depicted in the discard threshold value table 1, the red packet is not discarded, but stored in the packet buffer 7. Therefore, the event described in FIG. 3A does not occur, thereby allowing the low priority packets (red packets) to be prevented from excess discard.

Figure 5A:
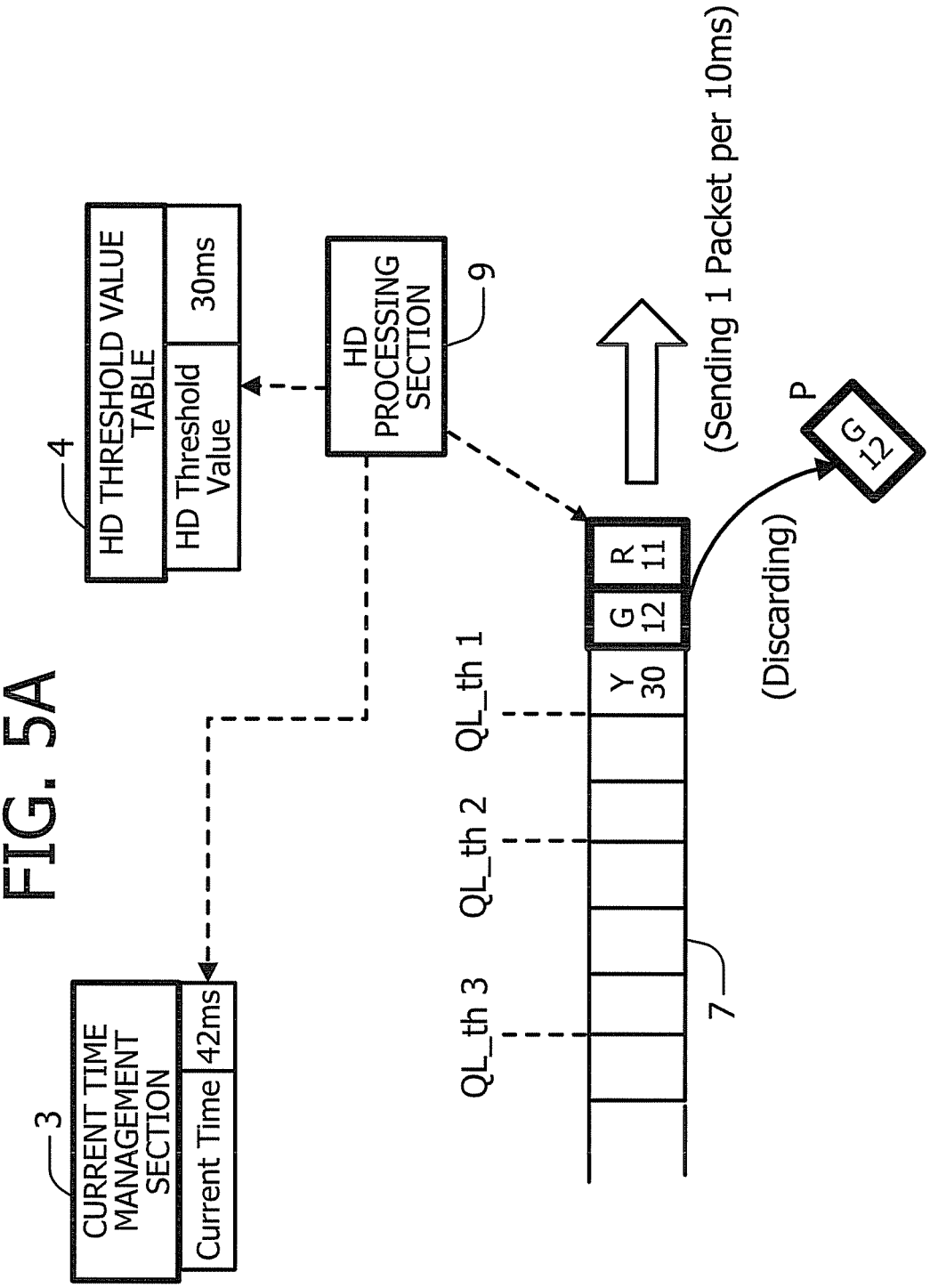
FIG. 5A is a schematic diagram illustrating an example of an event that can occur when a method for making discard determination for each priority of packet in a queue length-based manner, and a TBHD are combined.

FIG. 5A is a schematic diagram illustrating an example of an event that can occur when a method for making discard determination for each priority level of packet in a queue length-based manner, and the TBHD are combined. In FIG. 5A, the current time and the HD threshold value are the same as those shown in FIG. 3A. The top packet is a red packet, and the top time is "11". A packet subsequent to the top packet is a green packet, and its arrival time is "12". Therefore, the red packet as the top packet and the green packet as the subsequent packet are in danger of being discarded by the TBHD. Here, the unit of time is assumed, e.g., to be ms.

For example, the frequency with which packets are transmitted from the packet buffer 7 is assumed to be one packet per 10 ms. After the top packet has been transmitted, a next packet is transmitted 10 ms later. So, since the time interval between the sending of the green packet subsequent to the top packet and the sending of the top packet is only 1 ms, the green packet is undesirably discarded by the TBHD before being sent from the packet buffer 7. Since the green packet as the subsequent packet is a high priority packet, it is a packet that the user wants to prevent from being discarded. On the other hand, although the red packet as the top packet is a low priority packet, it is sent. When no red packet exists in the packet buffer 7, such a situation can be prevented. However, as depicted in FIG. 5A, when the queue length of the packet buffer 7 does not exceed the upper limit of the red packet, the red packet is unfavorably stored in the packet buffer 7. In this manner, when the method wherein the discard determination is made for each priority level of packet in a queue length-based manner, and the TBHD are combined, there occurs a possibility that high priority packets will be discarded while low priority packets will be sent.

Instead of the method wherein the discard determination is made for each priority level of packet in a queue length-based manner, the method wherein the discard determination is made for each priority level of packet in a time-based manner described in the second embodiment can be employed. In this case, low priority packets can be discarded before being stored in the packet buffer 7, irrespective of the queue length of the packet buffer 7, thereby inhibiting undesirable discard of high priority packets according to the TBHD caused by storing low priority packets in the packet buffer 7.

Figure 6:
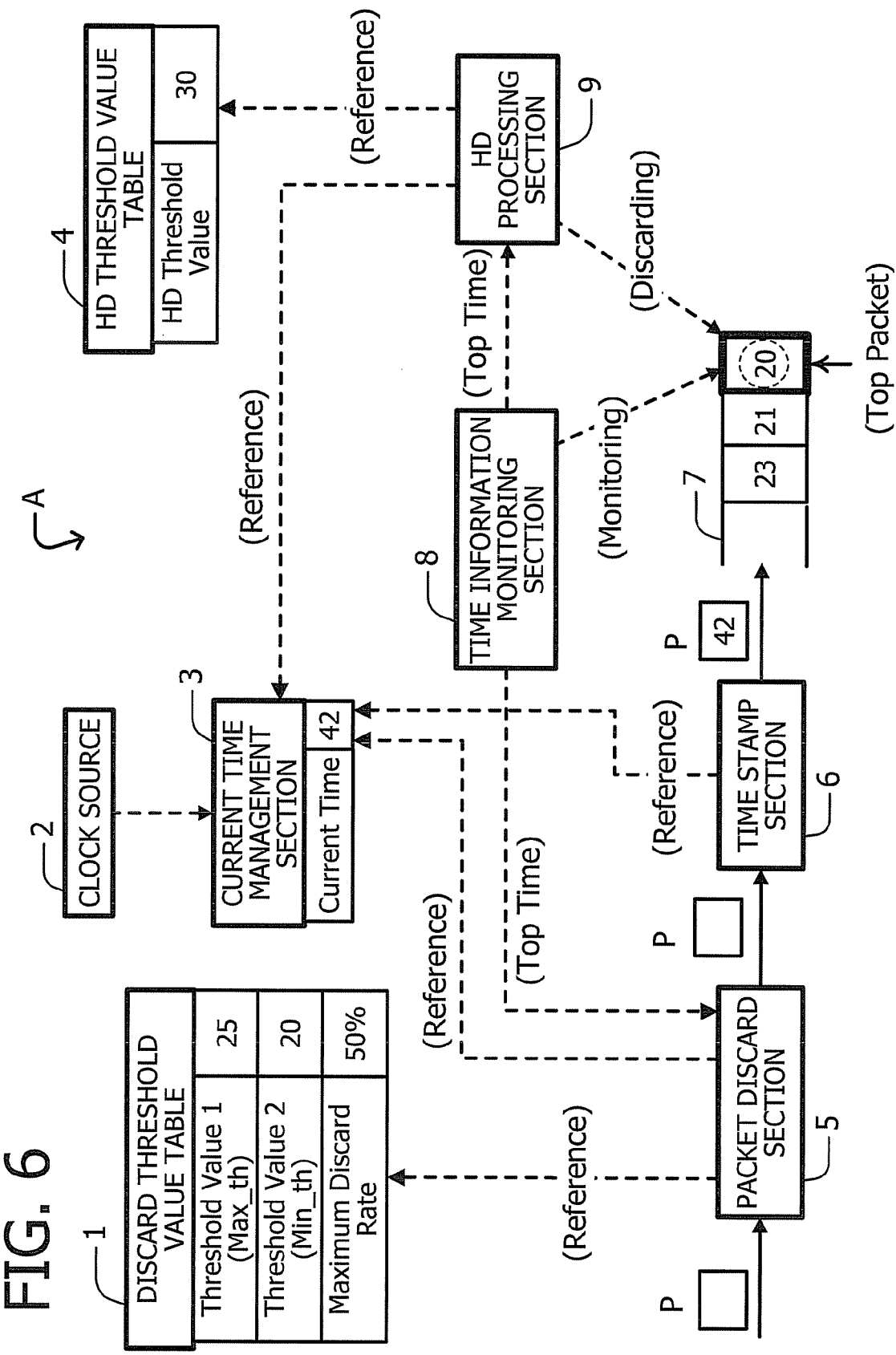
FIG. 6 is a diagram illustrating an example of a method for an arrival packet discard determination, according to a third embodiment.

FIG. 6 is a diagram illustrating an example of a method for an arrival packet discard determination according to a third embodiment, wherein the RED is performed in a time-based manner. Because the third embodiment has a configuration common to the first embodiment, differences therebetween are mainly described below, and commonalities therebetween are omitted from description.

The discard threshold value table 1 holds two threshold values: a threshold value 1 and a threshold value 2, as criteria for determining whether the arrival packet is to be discarded or to be stored in the packet buffer 7. The discard threshold value table 1 further holds a maximum discard rate. Here, the threshold value 1 indicates a maximum threshold value (Max_th) and the threshold value 2 indicates a minimum threshold value (Min_th).

Upon arrival of a packet, the packet discard section 5 acquires the current time, the top time, and the information held by the discard threshold value table 1. The packet discard section 5 determines to which out of the following conditional expressions 4-6, the relationship among the current time, the top time, and the information held by the discard threshold value table 1 conform.

(current time−top time)≦threshold value 2 [Conditional expression 4]

threshold value 2<(current time−top time)≦threshold value 1 [Conditional expression 5]

threshold value 1<(current time−top time) [Conditional expression 6]

When the conditional expression 4 is satisfied, the packet discard section 5 determines to store the arrival packet in the packet buffer 7.

When the conditional expression 5 is satisfied, the packet discard section 5 probabilistically discards the arrival packet on the basis of a discard probability derived from, for example, the following calculation formula 1.

discard probability=maximum discard rate×{(current time−top time)−threshold value 2}/(threshold value 1−threshold value 2) [Calculation formula 1]

When the conditional expression 6 is satisfied, the packet discard section 5 discards the arrival packet (Tail Drop).

For instance, in an example in FIG. 6, the value regarding each time is as follows: the current time is "42", the top time is "20", the threshold value 1 is "25", and the threshold value 2 is "20". The time information monitoring section 8 monitors the arrival time added to the top packet in the packet buffer 7, and holds the top time "20". The time information monitoring section 8 delivers the top time to the packet discard section 5 and the HD processing section 9.

Upon arrival of a packet, when the relationship among the current time, the top time, and the information held by the discard threshold value table 1 satisfies the condition 5, the packet discard section 5 discards the packet on the basis of the discard probability. Calculation of the discard probability gives the following result.

$$\begin{aligned}
\text{discard probability} &= \text{maximum discard rate} \times \\
&\quad \{(\text{current time} - \text{top time}) - \text{threshold value 2}\}/ \\
&\quad (\text{threshold value 1} - \text{threshold value 2}) \\
&= 0.5 \times \{(42 - 20) - 20\}/(25 - 20) \\
&= 0.5 \times 2/5 \\
&= 0.2
\end{aligned}$$

Therefore, the arrival packet is discarded with a probability of 20%.

On the other hand, the HD processing section 9 determines whether the top packet is to be discarded, on the basis of the current time, the top time, and the HD threshold value time of the HD threshold value table 4 (that is, TBHD processing is performed). In FIG. 6, current time "42"−top time "20"=22. Since this value is smaller than the HD threshold value "30", the HD processing section 9 does not discard the top packet.

Advantage of Third Embodiment

The discard threshold value table 1 holds the threshold value 1, the threshold value 2, and the maximum discard rate. The packet discard section 5 determines whether the arrival packet is to be discarded or to be stored in the packet buffer, on the basis of the current time, the top time, and the information held by the discard threshold value table 1. Here, the threshold value 1 stored in the discard threshold value table 1 indicates a maximum threshold value and the threshold value 2 stored therein indicates a minimum threshold value. When the difference between the current time and the top time is smaller than the threshold value 2, the packet discard section 5 stores the arrival packet in the packet buffer 7. When the difference exists between the threshold value 2 and the threshold value 1, the packet discard section 5 discards the arrival packet on a probabilistic basis. When the difference is larger than the threshold value 1, the arrival packet is discarded. By doing so, the RED can be implemented with time as an index (such RED is hereinafter referred to as "time-based RED").

By using the time-base RED, the following effect is produced as compared with the conventional RED (hereinafter, referred to as "queue length-based RED").

Figure 3B:
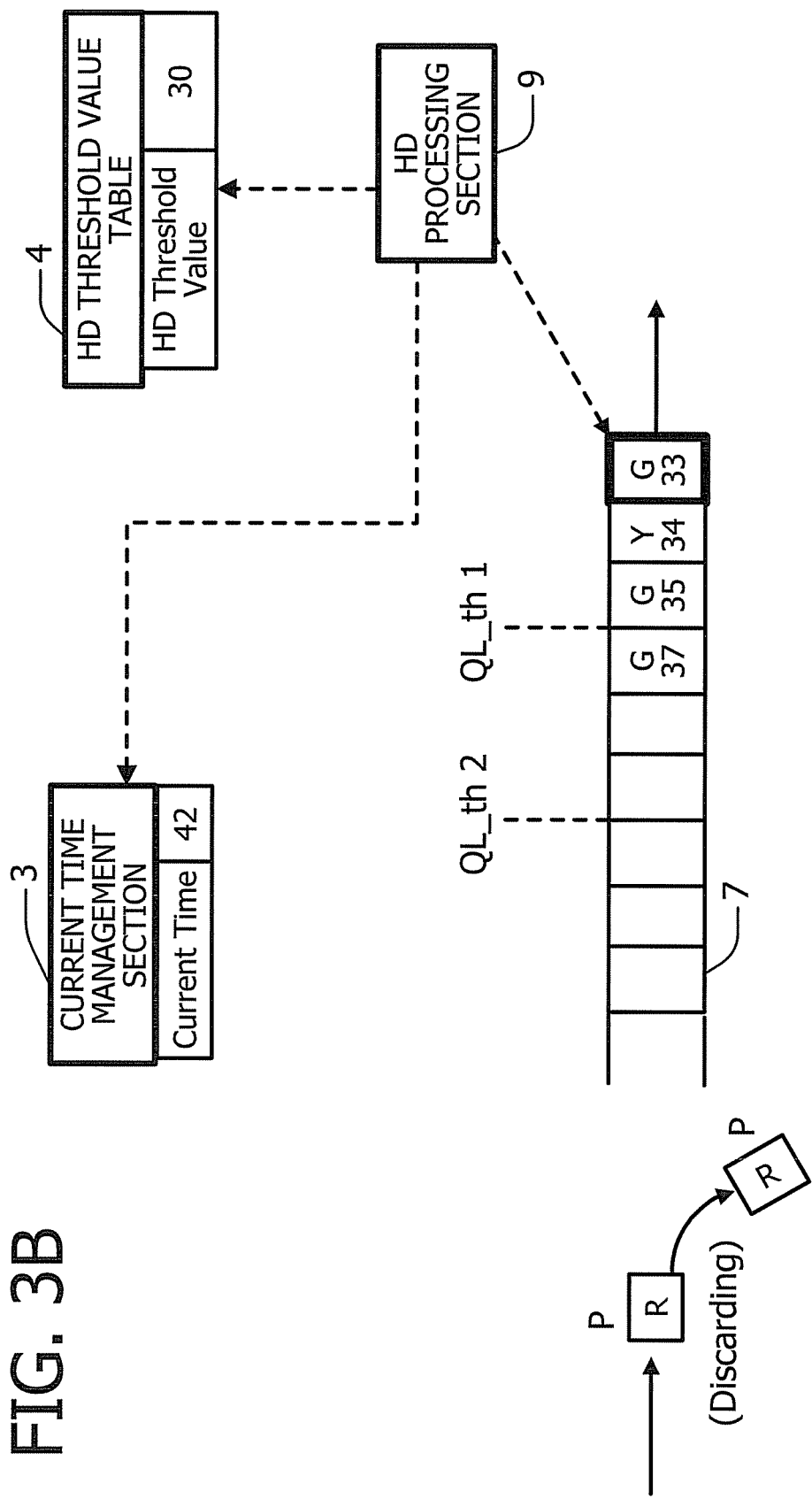
FIG. 3B is a schematic diagram for explaining an example of an event that can occur when a queue length-based Random Early Determination (RED) and a TBHD are combined.

FIG. 3B is a schematic diagram for explaining an example of an event that can occur when the queue length-based RED and the TBHD are combined. In FIG. 3B, the queue length threshold value 1 (QL_th 1) is assumed to be a minimum threshold value and the queue length threshold value 2 (QL_th 2) is assumed to be a maximum threshold value. There is a sufficient time leeway until the top packet is discarded by the TBHD (residence time "9"≦HD threshold value "30"). Also, the queue length of the packet buffer 7 exceeds the minimum threshold value of the queue length-based RED (i.e., queue length threshold value 1).

Since the queue length of the packet buffer 7 exceeds the minimum threshold value, when a packet arrives, the arrival packet is discarded on a probabilistic basis. That is, although there is a sufficient time leeway until the top packet is discarded by the TBHD, the arrived red packet is unfavorably discarded on a probabilistic basis because the queue length of the packet buffer 7 exceeds the minimum threshold value. Such a state is one wherein the queue length-based RED is not correctly functioning.

On the other hand, when the time-based RED is used, since the discard of the arrival packet is determined, for example, by the residence time of the top packet, use of the time-based RED allows the arrival packet to be prevented from being discarded although there is a sufficient time leeway until the top packet is discarded by the TBHD.

Figure 5B:
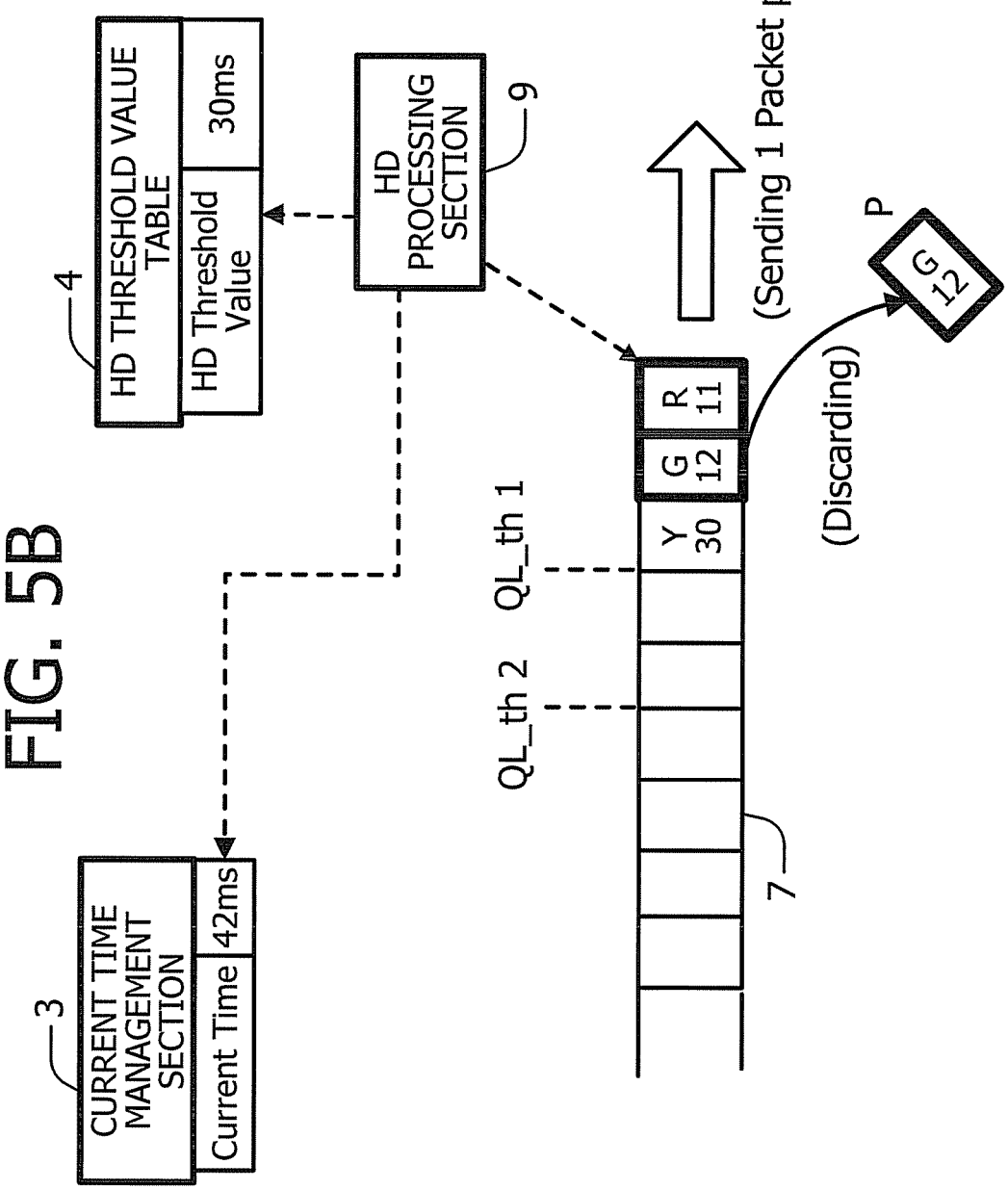
FIG. 5B is a schematic diagram illustrating an example of an event that can occur when a queue length-based RED and a TBHD are combined.

FIG. 5B is a schematic diagram illustrating an example of an event that can occur when the queue length-based RED and the TBHD are combined. In FIG. 5B, the queue length threshold value 1 (QL_th 1) is assumed to be a minimum threshold value and the queue length threshold value 2 (QL_th 2) is assumed to be a maximum threshold value.

In the situation depicted in FIG. 5B, since the frequency with which packets are sent from the packet buffer 7 is only one packet per 10 ms, when the top packet is sent, a subsequent packet may be undesirable discarded by the TBHD. At this time, if packet inputs to the packet buffer 7 can be adjusted in advance by the queue length-based RED, an occurrence of the above-described state will be preventable. However, when the queue length is short of the minimum threshold value, the arrival packet cannot be discarded.

For instance, FIG. 5B depicts an example of logical queues that the device has. Here, the device is assumed to have 1000 logical queues. In FIG. 5B, one packet is discarded from one logical queue. However, if phenomena as depicted in FIG. 5B simultaneously occur in the 1000 logical queues in the device, the number of discarded packets is 1000. If these discarded packets are TCP (transmission control protocol) packets, a TCP terminal is reduced in its sending rate by a congestion avoidance mechanism. That is, if mass discard of TCP packets occurs, there occurs a possibility that a large number of TCP terminals may decrease in the sending rate at one time to thereby cause global synchronization. The occurrence of the global synchronization increases a possibility that inputs to the buffer of the device are rapidly reduced to thereby make the buffer to cause underflow. This results in a reduced throughput of a network in its entirety.

The use of the time-based RED allows the arrival packet to be discarded on the basis of the residence time of the top packet without being constrained by the queue length, so that the state as depicted in FIG. 5B can be prevented. Eventually, the global synchronization can be prevented, and the throughput of the network in its entirety can be enhanced.

MODIFICATION

The discard threshold value table 1 may hold threshold values 1, threshold values 2, and maximum discard rates for each priority level of packet. In other words, the time-based RED may be performed for each priority level of packet. By doing so, the time-based RED can be performed while considering the priority of packet.

In the first to third embodiments, the discard of an arrival packet has been determined using the time of the top packet of the packet buffer 7. Instead, the discard of an arrival packet may be determined using an average value of arrival times added to a plurality of packets in the order from the top packet to the bottom one.

Here, description is made of, for example, the case wherein the average value of arrival times added to the packets from the top to the third packet, is used. In FIG. 6, the top packet in the packet buffer 7 is referred to as a first packet, a packet subsequent to the top packet is referred to as a second packet, and a packet subsequent to the second packet is referred to as a third packet.

For example, an arrival time added to the first packet (a first packet time) is assumed to be "12", a second packet time is assumed to be "13", and a third packet time is assumed to be "14". That is, this is the case wherein the arrival interval of packets is small (this case is referred to as "instance 1").

The time information monitoring section 8 calculates the average value of the first to third packet times, and transmits it to the packet discard section 5, as an average time. For example, average time=(12+13+14)/3=13. The packet discard section 5 determines whether the arrival packet is to be discarded or to be stored in the packet buffer 7, on the basis of the current time, the average time, and the information held by the discard threshold value table 1. In FIG. 6, current time "42"−average time "13"=29. This value is larger than the value "25" of the threshold value 1. That is, the condition 6 is satisfied. In this case, therefore, the arrival packet is discarded.

The instance 1 is the case wherein the arrival interval of packets is small, for example, the case wherein a terminal in the network transmits massive data at one time. In the instance 1, current time "42"−first packet time "12"=30. Since this value is equal to the HD threshold value time "30", the first packet is discarded by the TBHD. However, since the second packet time is "13", there is little time interval between the arrival time of the second packet and that of the first packet, so that a critical state wherein the second packet is also likely to be discarded continues. That is, in the packet buffer 7, such a critical state continues for a while (it is supposed that there is no leeway in queue length, as well). In this case, by using the average time as the average value among the first to third packet times for the arrival packet discard determination, the arrival packet can be discarded.

Next, for example, the first packet time is assumed to be "12", the second packet time is assumed to be "22", and the third packet time is assumed to be "35". That is, this is the case wherein the arrival interval of packets is large (this case is referred to as "instance 2").

In the instance 2, average time=(12+22+35)/3=23. Current time "42"−average time "23"=19. Since this value is smaller than the value "20" of the threshold value 2, the arrival packet is not discarded, but stored in the packet buffer 7.

The instance 2 is the case wherein the arrival interval of packets is large. In the instance 2, current time "42"−first packet time "12"=30. Since this value is equal to the HD threshold value time "30", the first packet is discarded by the TBHD. However, since the second packet time is "22", there is sufficient time interval between the second packet time and the first packet time, so that there is time leeway until the second packet is discarded. The third packet time is "35", and so there is a sufficient time interval between the third packet and the second packet time, as well. That is, in the packet buffer 7, when the first packet is discarded by the TBHD (or when it is sent), there is time leeway until the second packet is discarded (it is supposed that there is a leeway in queue length, as well). In this case, by using the average time as the average value among the first to third packet times for the arrival packet discard determination, the arrival packet can be stored in the packet buffer 7 without being discarded.

The first packet in the instance 1 and that in the instance 2 has the same first packet time. However, since the average time as the average value of the first to third packet times was used for the arrival packet discard determination, a difference is made in the result of the arrival packet discard determination between the instances 1 and 2. Thus, by employing the average time of arrival times of a plurality of packets for the arrival packet discard determination, the state of the network (for example, a state wherein one terminal transmits massive data at one time) can be considered. This allows the discard of arrival packets to be performed in accordance with a state of the network, resulting in an enhanced throughput of the network in its entirety.

Figure 7:
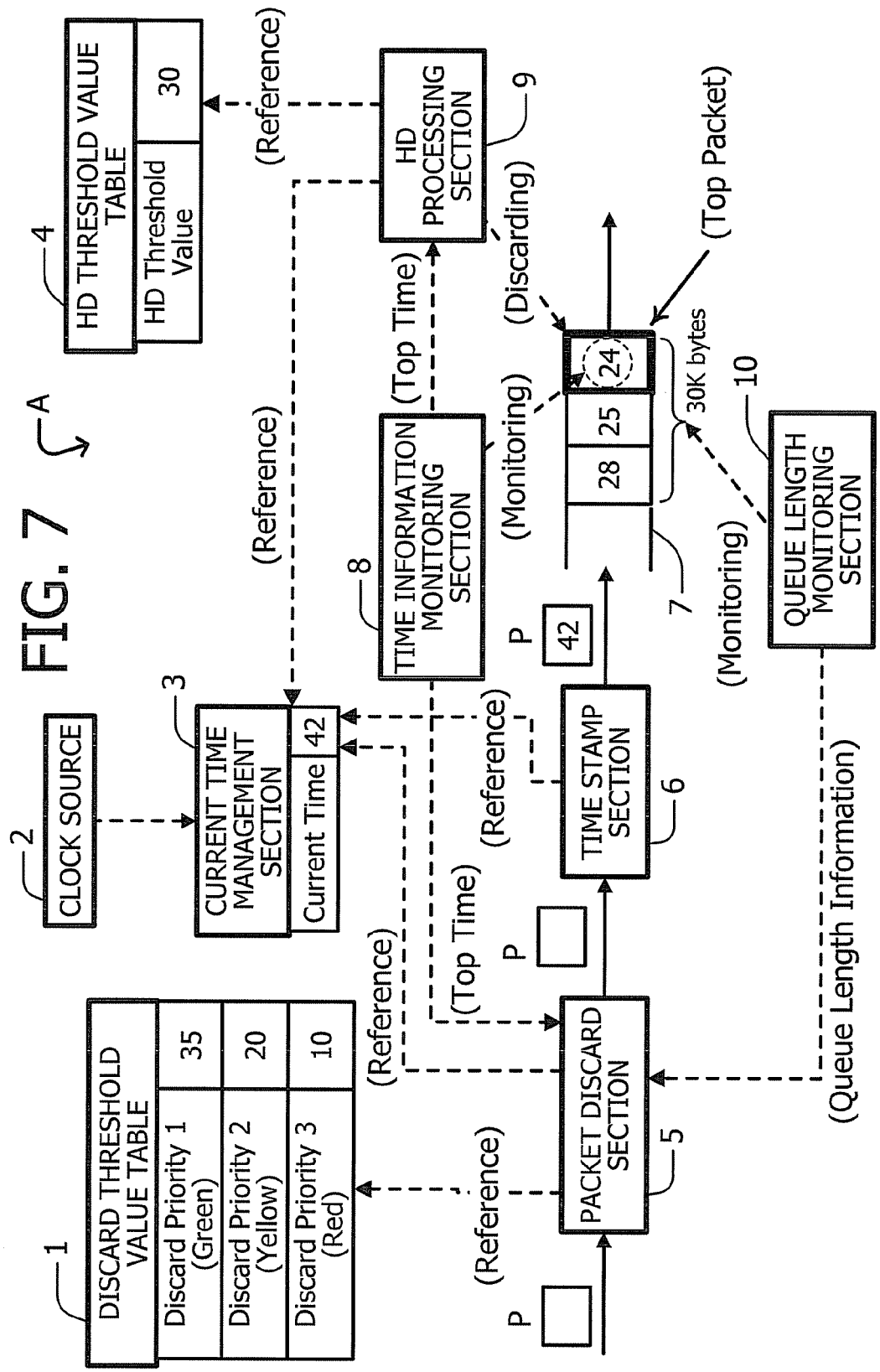
FIG. 7 is a diagram illustrating an example of an arrival packet discard determination method according to a fourth embodiment.

FIG. 7 is a diagram illustrating an example of an arrival packet discard determination method according to a fourth embodiment, wherein the arrival packet discard determination is made by combining the residence time of the packet and the queue length. Because the fourth embodiment has a configuration common to the first embodiment, differences therebetween are mainly described below, and commonalities therebetween are omitted from description.

In the fourth embodiment, for the arrival packet discard determination, the queue length of the packet buffer 7 is used in addition to the current time, the top time, and the information held by the discard threshold value table 1.

A queue length monitoring section 10 monitors the queue length of the packet buffer 7. The queue length monitoring section 10 delivers information on the queue length of the packet buffer 7 as queue length information, to the packet discard section 5.

In FIG. 7, the discard threshold value table 1 holds threshold values for each priority of packet. The discard threshold value table 1 may have any configuration.

Figure 8:
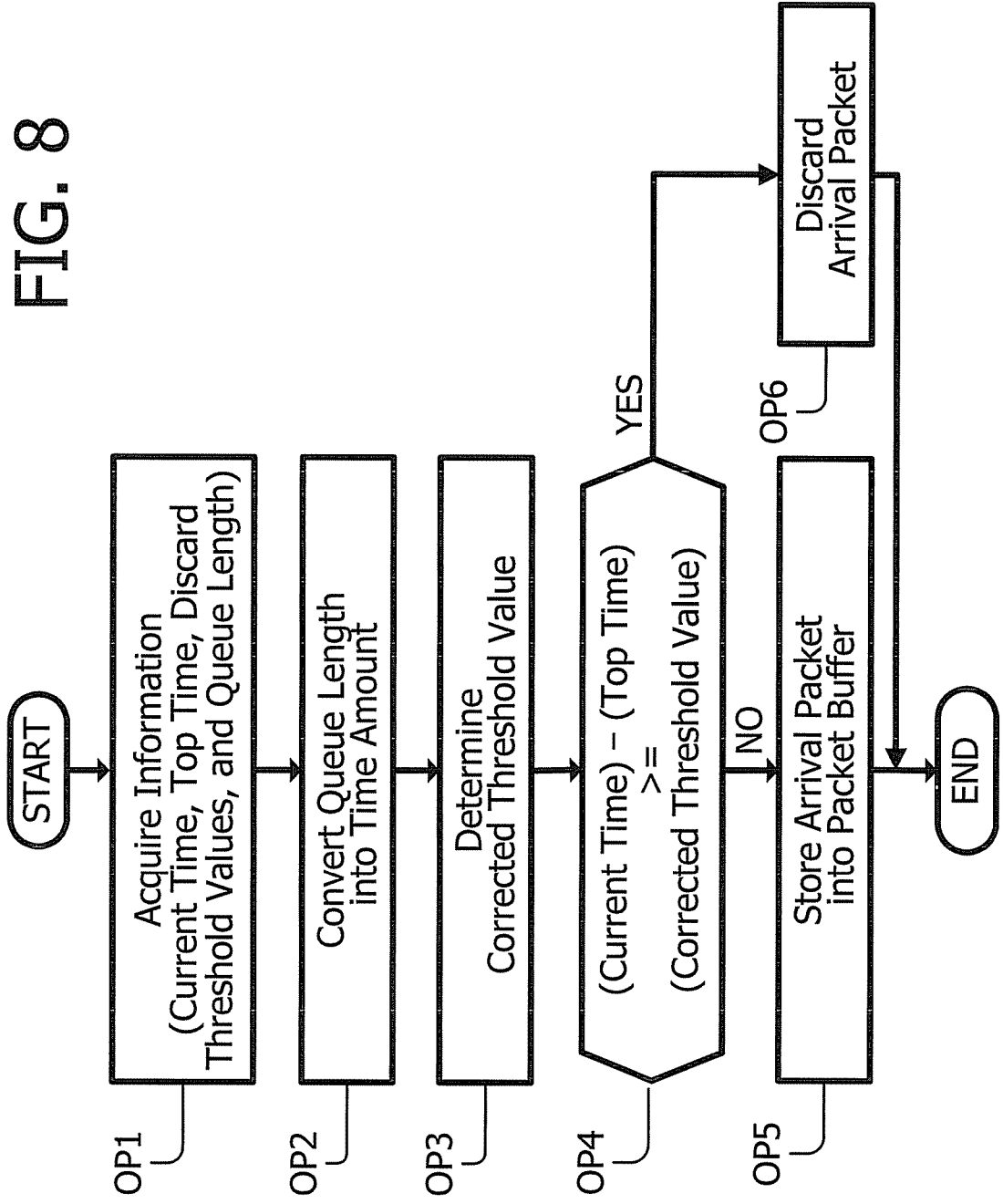
FIG. 8 is a diagram illustrating an example of an operation flowchart for an arrival packet discard determination, according to a fourth embodiment.

FIG. 8 is a diagram illustrating an example of an operation flowchart for arrival packet discard determination of the packet discard section 5. Upon arrival of a packet having the discard priority 2, the packet discard section 5 acquires the current time, the top time, queue length information, and a threshold value of a discard priority corresponding to the arrival packet (OP1). In FIG. 7, the current time is "42", the top time is "24", the queue length information (queue length of the packet buffer 7) is 30 Kbytes, and the threshold value corresponding to the discard priority 2 is "20".

Figure 9:
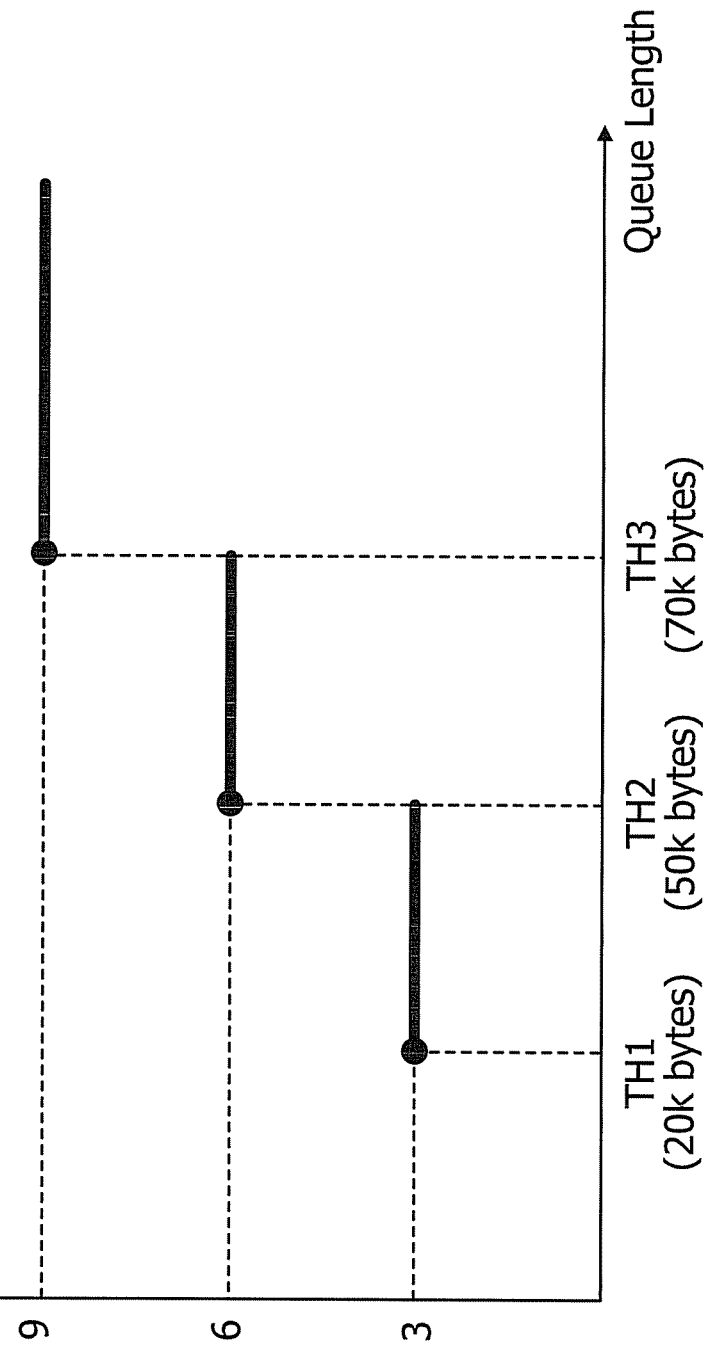
FIG. 9 is a diagram illustrating an example of a conversion table for converting a queue length into a time amount, according to the fourth embodiment.
Figure 10:
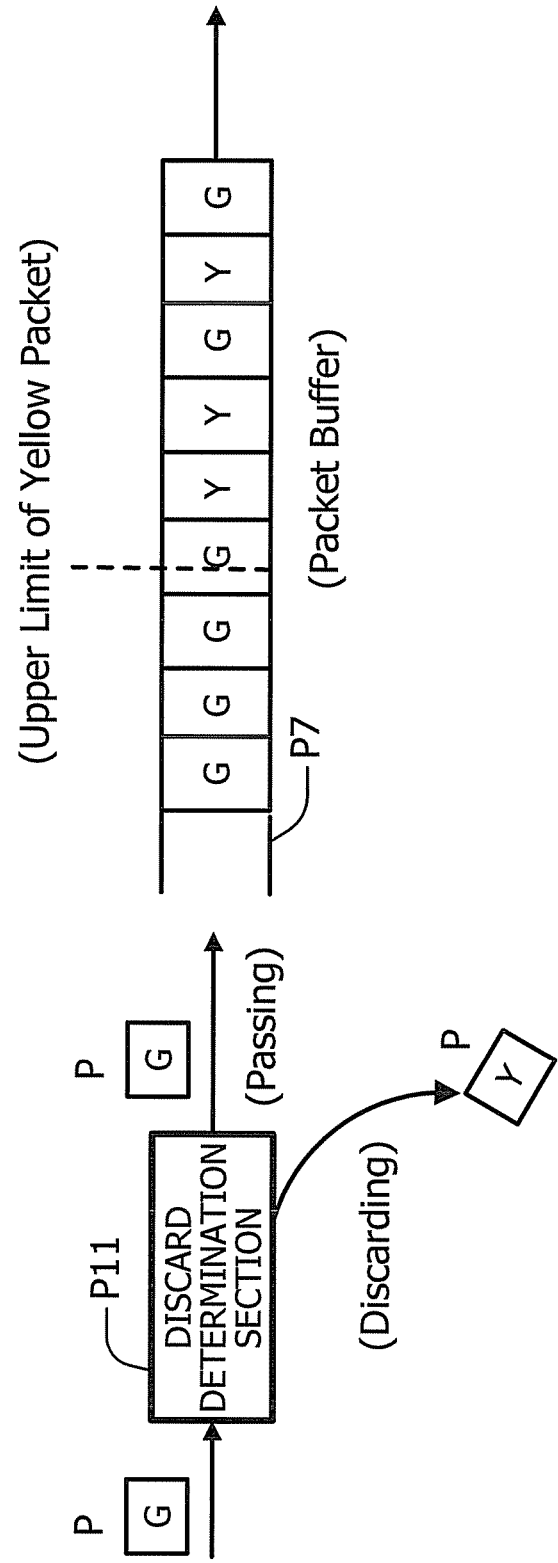
FIG. 10 is a schematic diagram illustrating an example of a method for an arrival packet discard determination by using discard priority.
Figure 11:
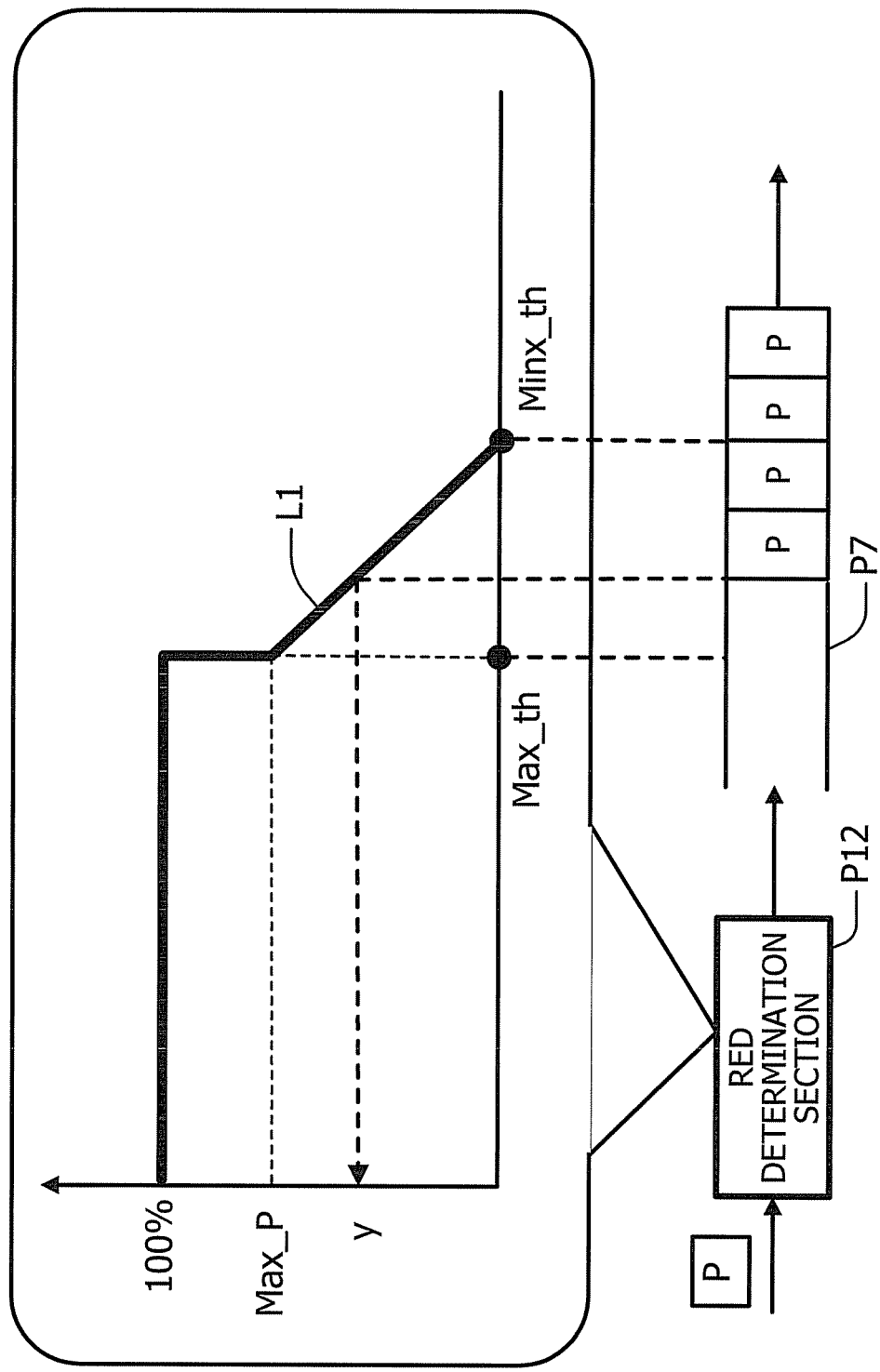
FIG. 11 is a schematic diagram illustrating an example of a method for an arrival packet discard determination referred to as a RED.

The packet discard section 5 converts the queue length in the obtained queue length information into a time amount (OP2). At this time, for example, a conversion table as depicted in FIG. 9 can be used. The conversion table in FIG. 9 is a table in which some threshold values are previously sets for the queue length, and which illustrates that the time amount is stepwise determined in accordance with the queue length. Since the queue length is 30 Kbytes, the converted time amount "3" is obtained from the table depicted in FIG. 9.

The packet discard section 5 corrects the threshold value of discard priority 2 by using the converted time amount, to determine the corrected threshold value (OP3). The corrected threshold value can be determined by the following calculation formula 2.

corrected threshold value=threshold value−converted time amount=20−3=17  [Calculation formula 2]

On the basis of this corrected threshold value, the current time, and the top time, an arrival packet discard determination is made (OP4). In the case, since current time−top time=42−24=18, and this value is larger than the corrected threshold value "17" (OP4: YES), the arrival packet is discarded (OP6). When the value (current time−top time) is smaller than the corrected threshold value (OP4: NO), the arrival packet is stored in the packet buffer 7.

Advantage of Fourth Embodiment

By using the time amount converted from the queue length of the packet buffer 7 for the arrival packet discard determination, as the queue length of the packet buffer 7 becomes larger (i.e., as the number of packets stored in the packet buffer 7 becomes larger), the threshold value serving as a criterion for the arrival packet discard becomes smaller, thereby making the onset of the arrival packet discard earlier. This makes it possible to implement correct and rapid discard processing in accordance with a state in the packet buffer 7, or a flow amount of packets inputted to the device.

What is claimed is:

1. An apparatus, comprising:
a memory configured to temporarily store one or more packets to be transmitted, each of the one or more packets being added with an arrival time at which the each of the one or more packets arrived at the apparatus; and
a processor configured to:
calculate a packet residence time indicating magnitude of an elapsed time during which at least one packet included in the one or more packets has been staying in the memory, using a current time and at least one arrival time added to the at least one packet, the at least one packet including a longest-staying packet that has been staying in the memory for the longest time period among the one or more packets,
determine whether an arrival packet that has newly arrived at the apparatus, is to be discarded or to be stored in the memory, based on the calculated packet residence time,
add, to the arrival packet that has been determined to be stored in the memory, the arrival time at which the arrival packet arrived at the apparatus, and
store the arrival packet added with the arrival time in the memory as one of the one or more packets to be transmitted.

2. The apparatus of claim 1, further comprising:
a discard threshold value table including a discard threshold value, wherein
the processor determines that the arrival packet is to be discarded when the packet residence time is greater than or equal to the discard threshold value, and otherwise the processor determines that the arrival packet is to be stored in the memory.

3. The apparatus of claim 1, further comprising:
a discard threshold value table including a discard threshold value for each of priority levels capable of being assigned to the one or more packets, wherein
the processor determines that the arrival packet is to be discarded when the packet residence time is greater than or equal to the discard threshold value corresponding to a priority level assigned to the arrival packet, and otherwise
the processor determines that the arrival packet is to be stored in the memory.

4. The apparatus of claim 1, further comprising:
a discard threshold value table including a first discard threshold value and a second discard threshold value smaller than the first discard threshold value, wherein
the processor determines that the arrival packet is to be stored in the memory when the packet residence time is smaller than or equal to the second discard threshold value,
the processor determines that the arrival packet is to be discarded with a predetermined probability when the packet residence time is greater than the second discard threshold value and smaller than or equal to the first discard threshold value, and
the processor determines that the arrival packet is to be discarded when the packet residence time is greater than the first discard threshold value.

5. The apparatus of claim 1, further comprising:
a discard threshold value table including a first discard threshold value and a second discard threshold value smaller than the first discard threshold value, for each of priority levels capable of being assigned to the one or more packets, wherein
the processor determines that the arrival packet is to be stored in the memory when the packet residence time is smaller than or equal to the second discard threshold value corresponding to the priority level assigned to the arrival packet,
the processor determines that the arrival packet is to be discarded with a predetermined probability when the packet residence time is greater than the second discard threshold value corresponding to the priority level assigned to the arrival packet and smaller than or equal to the first threshold value corresponding to the priority level assigned to the arrival packet, and
the processor determines that the arrival packet is to be discarded when the packet residence time is greater than the first discard threshold value corresponding to the priority level assigned to the arrival packet.

6. The apparatus of claim 1,
wherein the processor
monitors a size of area occupied by the one or more packets staying in the memory, and
determines whether the arrival packet is to be discarded or to be stored in the memory, based on the packet residence time and the size of area occupied by the one or more packets staying in the memory.

7. The apparatus of claim 1, wherein
the packet residence time is calculated as a difference between the current time and a packet arrival time added to the longest-staying packet that has been staying in the memory for the longest time period among the one or more packets staying in the memory.

8. The apparatus of claim 1, wherein
the packet residence time is calculated as a difference between the current time and an average value of the at least one arrival time added to the at least one packet staying in the memory.

9. The apparatus of claim 1, wherein the processor discards a packet that has been staying in the memory for a time period greater than a predetermined threshold value.

10. A method comprising:
providing a memory to temporarily store one or more packets to be transmitted, each of the one or more packets being added with an arrival time at which the each of the one or more packets arrived;
calculating a packet residence time indicating magnitude of an elapsed time during which at least one packet included in the one or more packets has been staying in the memory, using a current time and at least one arrival time added to the at least one packet, the at least one packet including a longest-staying packet that has been staying in the memory for the longest time period among the one or more packets;
determining whether an arrival packet that has newly arrived, is to be discarded or to be stored in the memory, based on the calculated packet residence time;
adding, to the arrival packet that has been determined to be stored in the memory, the arrival time at which the arrival packet arrived; and
storing the arrival packet added with the arrival time in the memory as one of the one or more packets to be transmitted.

11. The method of claim 10, further comprising:
providing a discard threshold value table including a discard threshold value, wherein
it is determined in said determining that the arrival packet is to be discarded when the packet residence time is greater than or equal to the discard threshold value, and
otherwise it is determined in said determining that the arrival packet is to be stored in the memory.

12. The method of claim 10, further comprising:
providing a discard threshold value table including a discard threshold value for each of priority levels capable of being assigned to the one or more packets, wherein
it is determined in said determining that the arrival packet is to be discarded when the packet residence time is greater than or equal to the discard threshold value corresponding to a priority level assigned to the arrival packet, and
otherwise it is determined in said determining that the arrival packet is to be stored in the memory.

13. The method of claim 10, further comprising:
providing a discard threshold value table including
a first discard threshold value and a second discard threshold value smaller than the first discard threshold value, wherein
it is determined in said determining that the arrival packet is to be stored in the memory when the packet residence time is smaller than or equal to the second discard threshold value,
it is determined in said determining that the arrival packet is to be discarded with a predetermined probability when the packet residence time is greater than the second discard threshold value and smaller than or equal to the first discard threshold value, and
it is determined in said determining that the arrival packet is to be discarded when the packet residence time is greater than the first discard threshold value.

14. The method of claim 10, further comprising:
providing a discard threshold value table including a first discard threshold value and a second discard threshold value smaller than the first discard threshold value, for each of priority levels capable of being assigned to the one or more packets wherein
it is determined in said determining that the arrival packet is to be stored in the memory when the packet residence time is smaller than or equal to the second discard threshold value corresponding to the priority level assigned to the arrival packet,
it is determined in said determining that the arrival packet is to be discarded with a predetermined probability when the packet residence time is greater than the second discard threshold value corresponding to the priority level assigned to the arrival packet and smaller than or equal to the first threshold value corresponding to the priority level assigned to the arrival packet, and
it is determined in said determining that the arrival packet is to be discarded when the packet residence time is greater than the first discard threshold value corresponding to the priority level assigned to the arrival packet.

15. The method of claim 10, further comprising:
monitoring a size of area occupied by the one or more packets staying in the memory, wherein
it is determined in said determining whether the arrival packet is to be discarded or to be stored in the memory, based on the packet residence time and the size of area occupied by the one or more packets staying in the memory.

16. The method of claim 10, wherein
the packet residence time is calculated as a difference between the current time and the arrival time added to the longest-staying packet that has been staying in the memory for the longest time period among the one or more packets staying in the memory.

17. The method of claim 10, wherein
the packet residence time is calculated as a difference between the current time and an average value of the at least one arrival time added to the at least one packet staying in the memory.

18. The method of claim 10, further comprising
discarding a packet that has been staying in the memory for a time period greater than a predetermined threshold value.

19. An apparatus comprising:
a memory to temporarily store one or more packets to be transmitted, each of the one or more packets being added with an arrival time at which the each of the one or more packets arrived at the apparatus; and
a processor to:
calculate a packet residence time indicating magnitude of an elapsed time during which at least one first packet included in the one or more packets to be transmitted has been staying in the memory, using a current time and at least one arrival time added to the at least one first packet, the at least one first packet including a longest-staying packet that has been staying in the memory for the longest time period among the one or more packets to be transmitted, determine whether a second packet that has newly arrived at the apparatus from outside the apparatus and is not stored in the memory is to be discarded or to be stored in the memory, based on the calculated packet residence time, add, to the second packet that has been determined to be stored in the memory, the arrival time at which the second packet arrived at the apparatus, and store the second packet added with the arrival time in the memory by adding the second packet added with the arrival time to the one or more packets to be transmitted.

\* \* \* \* \*